United States Patent Office 2,895,870
Patented July 21, 1959

2,895,870

GRAIN FUMIGANT COMPOSITION AND METHOD FOR MAKING AND USING SAME

Joseph R. Baldridge, Mentor, Ohio, assignor to Diamond Alkali Company, Cleveland, Ohio, a corporation of Delaware No Drawing. Application February 17, 1958
Serial No. 715,485

9 Claims. (Cl. 167—22)

This invention relates to new and useful insecticidal compositions and more particularly relates to improvements in grain fumigant compositions and to a method for fumigating insect-infested grain and similar substances.

The control of weevils, bran bugs, and related insect pests is a problem of major importance in the storage of grain, seeds, and similar food materials. In practice, such stored grain is frequently held in bins or elevators for extended periods of time and if untreated, may become so badly infested with the insects as to be of little value.

While a variety of organic compounds has been suggested heretofore and used commercially as grain fumigants, the problem of controlling insect infestation of grain remains a serious one. One of the difficulties in many prior fumigant materials has been their high flammability as evidenced by their low flash points. For example, while carbon disulfide used alone would be an excellent fumigant, as far as its fumigating qualities are concerned, its use is highly impracticable because of its high flammability. Accordingly, in practice, it has been necessary heretofore to formulate a fumigant composition so as to provide a reasonably safe material from the standpoint of fire hazard.

Exemplary of such formulations is a mixture containing about 80% carbon tetrachloride and about 20% carbon disulfide, which formulation has been used extensively in the past and is commonly known in the trade as an "80–20" mixture. Although this mixture, like carbon disulfide alone, is an excellent fumigant as far as its fumigating qualities are concerned, its flash point is sufficiently low so as to present a fire hazard when used.

More recently, it has been proposed to use a mixture containing about 79 parts by volume carbon tetrachloride, about 21 parts by volume carbon disulfide, about 3 parts by volume petroleum ether, and about 1½% by weight of the other constituents of sulfur dioxide. Although this formulation has proved to have excellent fumigating qualities and its complete absence of a flash point removes any fire hazard, other difficulties have been experienced in its use.

The presence of sulfur dioxide in the formulation has been found to be at least irritating if not potentially dangerous to the personnel who are working with the formulation, both in its preparation and use, inasmuch as the $SO_2$ is difficult to put into the formulation and readily escapes during application of the fumigant to the grain. Additionally, the presence of sulfur dioxide in the formulation necessitates that the fumigant be packaged in tightly sealed drums to prevent the escape of $SO_2$ vapors, thereby preventing the storage of the fumigant in bulk, i.e., transportation in tank cars or tank trucks to a bulk storage tank, which practice has become increasingly popular in the industry. Moreover, the presence of sulfur dioxide in the formulation presents a corrosion problem in that the sulfur dioxide readily reacts with any oxygen and moisture present to form sulfuric acid which is extremely corrosive, readily attacking any metal with which it comes in contact.

It is, therefore, an object of the present invention to provide new and improved grain fumigants which are exceedingly toxic to insect life, even at low concentrations, and which are characterized by a lack of flash point.

A further object of this invention is to provide an improved grain fumigant composition of the above type, which composition is not subject to the disadvantages of corrosion and which is not injurious to the health of those working with it.

A still further object of the present invention is to provide an improved fumigant of the above type, which fumigant may readily be transported in bulk.

These and other objects will become apparent to those skilled in the art from the description of the invention which follows.

In the past, in formulating a grain fumigant composition having no flash point, i.e., one which is substantially non-flammable, it has been believed to be essential to include as a necessary part of this formulation, sulfur dioxide. It has been found that in a fumigant formulation containing carbon tetrachloride and carbon disulfide without sulfur dioxide, even when petroleum ether is present, the formulation still had a flash point sufficiently low to present a fire hazard during its use. It has now been found, in the practice of the present invention, that by reducing the carbon disulfide content from about 20% by volume to within the range of 16.5–17.5% by volume, a fumigant composition can be compounded with carbon tetrachloride, carbon disulfide, and petroleum ether, without sulfur dioxide, which composition has no flash point at temperatures at or above the boiling point of the mixture, while still maintaining a high insect toxicity.

The constituents of the foregoing composition may be the chemically pure compounds or, if desired, such materials as are available commercially. The expression "petroleum ether," as used herein, is intended to include such materials falling within the definitions as set forth in Hackh's Chemical Dictionary, third edition, page 635, wherein petroleum ether is described as a mixture of $C_5$ and $C_6$ hydrocarbons, the mixture having a boiling point range of approximately 40°–60° C., as well as normal hydrocarbon constituents thereof, i.e., normal pentane and normal hexane.

It has been found in the practice of the present invention, that an excellent grain fumigant formulation, both from the standpoint of fumigating qualities as well as flash point, is formed using 82–83% by volume carbon tetrachloride, 16.5–17.5% by volume carbon disulfide and .5–1% by volume petroleum ether. A preferred fumigant formulation of this type is one having the following composition in percent by volume:

| | Percent |
|---|---|
| Carbon tetrachloride | 82.3 |
| Carbon disulfide | 17.2 |
| Petroleum ether | 0.5 |

At present, it is not clearly understood just why the addition of a small amount of petroleum ether to the foregoing binary mixture produces such an effective fumigant having a complete lack of flash point. However, by way of theory, which is not to be construed as limiting the present invention in any way, it is believed that the petroleum ether exhibits a singular chemical affinity in a binary solvent blend of carbon tetrachloride and carbon disulfide, serving to eliminate the flash point and the otherwise high flammability of the mixture. Regardless of theory, the addition of the petroleum ether to the above-described mixture does, in fact, produce a synergistic fumigant mixture having no flash point.

The following table, wherein quantities are expressed in terms of percent by volume, illustrates varying compositions and their resulting flash points; the expression "flash point" as used herein means the lowest temperature at which the vapors of a liquid may be ignited momentarily by passing a flame over the liquid. Such a test is described in detail in ASTM Standard D92-52 as the so-called "Cleveland flash cup" test.

*Table*

| Ingredients | 1 | 2 | 3 | 4 | 5 | 6 | 7 | 8 | 9 | 10 | 11 |
|---|---|---|---|---|---|---|---|---|---|---|---|
| $CCl_4$ | 82 | 83 | 82 | 82 | 83 | 82.3 | 80 | 80 | 81.5 | 90 | 76.7 |
| $CS_2$ | 17.5 | 16.5 | 17 | 17.5 | 16.5 | 17.2 | 20 | 19 | 18 | 10 | 20.7 |
| Petroleum Ether | 0.5 | 0.5 | 1 | | | 0.5 | | 1 | 0.5 | | 2.6 |
| n-pentane | | | | 0.5 | | | | | | | |
| n-hexane | | | | | 0.5 | | | | | | |
| Flash Point, ° C | No flash @ 50° C., test discontinued | | | | | | −18 | −10 | −5 | 4.5 | 25.5 |

From the above table, it can be seen that compositions 1–6, which contain 16.5–17.5% by volume carbon disulfide, exhibit no flash points up to 50° C., which temperature includes the boiling point of the mixture, at which temperature the tests are discontinued. It will be noted that the results are not changed whether these compositions contain petroleum ether, normal pentane or normal hexane. On the other hand, compositions 7, 8 and 9, which contain an amount of carbon disulfide in an excess of 17.5%, although also containing petroleum ether, exhibit relatively low flash points and hence their use as a fumigant involves a fire hazard. Compositions 10 and 11 illustrate that when the compositions contain no petroleum ether, the flash point is extremely low and hence the composition is highly inflammable.

It has been found that the fumigating qualities of formulations containing 82–83% carbon tetrachloride, 16.5–17.5% carbon disulfide, and 0.5–1% petroleum ether are excellent, being comparable to those of the "80–20" mixes, i.e., 80% carbon tetrachloride, 20% carbon disulfide, which mixes are well known in the art to be highly effective fumigants.

In practice, fumigants of the present invention may be employed by sprinkling, spraying, or pouring the fumigant over the grain, seed, or other material to be fumigated in amounts particularly ranging from about 0.5 gallon to 7.5 gallons per 1000 bushels. The lack of flammability of compositions of the present invention permit safe handling and substantially eliminate fire hazards in the fumigation operation.

While the foregoing description is particularly directed to the fumigation of grain and related products, it is to be understood that the novel fumigant products of the present invention also may be employed in household fumigation, vault fumigation and the like, wherever a highly effective toxicant material is required.

While there have been described various embodiments of the invention, the methods and products described are not intended to be understood as limiting the scope of the invention, as it is realized that changes therein are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A fumigant composition comprising 82–83% by volume carbon tetrachloride, 16.5–17.5% by volume carbon disulfide and 0.5–1% by volume petroleum ether.

2. A fumigant composition comprising 82–83% by volume carbon tetrachloride, 16.5–17.5% by volume carbon disulfide and 0.5–1% by volume normal pentane.

3. A fumigant composition comprising 82–83% by volume carbon tetrachloride, 16.5–17.5% by volume carbon disulfide and 0.5–1% by volume normal hexane.

4. A fumigant composition comprising 82.3% by volume carbon tetrachloride, 17.2% by volume carbon disulfide and 0.5% by volume petroleum ether.

5. A fumigant composition comprising 83% by volume carbon tetrachloride, 16.5% by volume carbon disulfide and 0.5% by volume petroleum ether.

6. A fumigant composition comprising 82% by volume carbon tetrachloride, 17% by volume carbon disulfide, and 1% by volume petroleum ether.

7. A fumigant composition comprising 82% by volume carbon tetrachloride, 17.5% by volume carbon disulfide and 0.5% by volume petroleum ether.

8. The method of fumigating an insect-infested material and space, said method comprising contacting said material and space with a mixture comprising 82.3% by volume carbon tetrachloride, 17.2% by volume carbon disulfide and 0.5% by volume petroleum ether.

9. The method of preparing a substantially non-flammable toxic fumigant comprising the steps of mixing 82.3% by volume carbon tetrachloride with 17.2% by volume carbon disulfide and adding thereto 0.5% by volume petroleum ether to impart substantial non-flammability to said mixture.

References Cited in the file of this patent

UNITED STATES PATENTS

| | | |
|---|---|---|
| 1,184,879 | Scheuer | May 30, 1916 |
| 2,128,433 | Rotheim | Aug. 30, 1938 |
| 2,803,581 | Hibbard | Aug. 20, 1957 |

OTHER REFERENCES

Hackh's Chem. Dictionary, The Blakiston Co., 3rd ed., p. 635.